Dec. 16, 1930.　　　T. M. RUSSELL　　　1,785,391
METHOD OF MAKING BRAKE BANDS AND THE LIKE
Filed Nov. 26, 1926
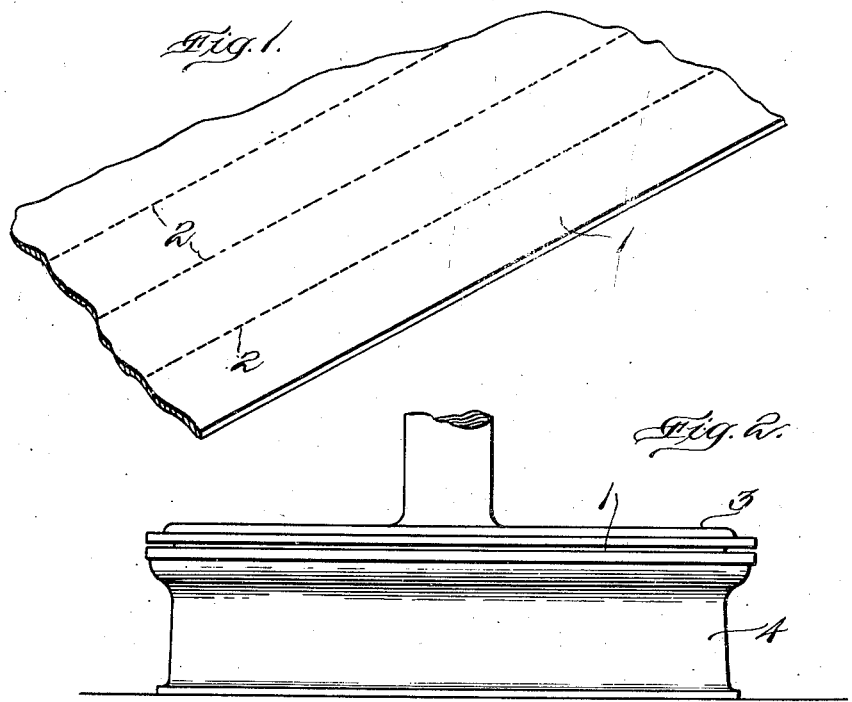
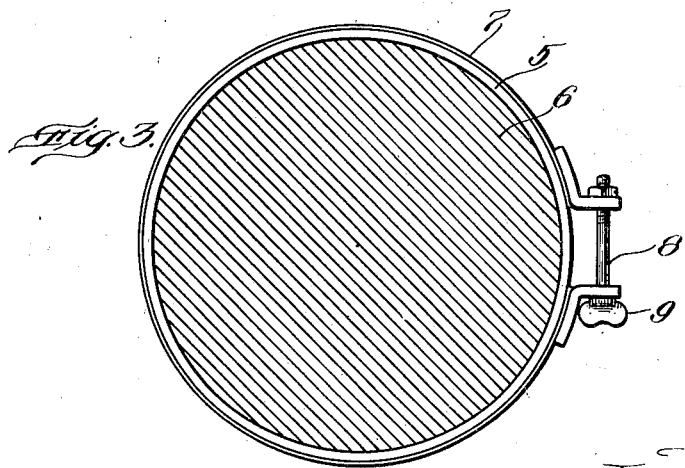
Inventor:
Thomas M. Russell
by Chas. F. Randall
Atty.

Patented Dec. 16, 1930

1,785,391

UNITED STATES PATENT OFFICE

THOMAS M. RUSSELL, OF MIDDLETOWN, CONNECTICUT, ASSIGNOR TO THE RUSSELL MANUFACTURING COMPANY, OF MIDDLETOWN, CONNECTICUT, A CORPORATION OF CONNECTICUT

METHOD OF MAKING BRAKE BANDS AND THE LIKE

Application filed November 26, 1926. Serial No. 150,787.

The invention has relation to the manufacture of brake bands, clutch bands, brake blocks, and other similar curved articles of the same general class, either completely annular, substantially annular, or segmental; and more particularly relates to the manufacture of those which are composed of material capable of acquiring a permanent more or less completely circular form, or otherwise curved form, in the process of manufacture. The articles which are contemplated include such as are employed in automobiles, and in the winding mechanism of industrial cranes and hoists, as well as those which are used in other like connections.

Articles of the general class aforesaid which are composed of material capable of acquiring a permanent curved and more or less completely circular form in the process of manufacture are produced at present in the art by a method involving the use of dies or moulds. In proceeding according to the said method a quantity of suitable material is placed in a mould having an internal cavity corresponding in shape, proportions, and curvature with the band, brake block, or other article, desired to be produced, and the contents of the mould are subjected therein to pressure and heat. The result is that when the mould is opened and the moulded article is removed therefrom such article is a band, brake block, or other article having the thickness, breadth, and length of the brake or other band, or other article, undertaken to be made, and having the curvature the completed band or other article has when applied in use.

Very serious drawbacks attend the employment of moulds in manufacturing brake bands, clutch bands, brake blocks, and the like. Moulds are expensive. Much labor and time are expended in making them; hence delays occur in getting them in shape. Brake and other bands of a great many different diameters, widths, thicknesses, are called for by the market, and similar differences occur in the case of brake blocks. Inasmuch as every difference in respect of any one of these features necessitates employment of a mould especially providing therefor, the manufacturer of brake and other bands of the general class aforesaid, brake blocks and the like, is burdened by the necessity of making or procuring a large number of moulds, with accompanying inconvenience and great expense. Moulds are bulky and heavy, and consequently inconvenient to handle, and require storage room. The rate of production of brake bands, etc., by means of moulds is slow. Hence a large plant, extensive equipment, and numerous workpeople are necessary, for production on any considerable scale. The use of moulds in manufacturing adds very materially to the cost of manufacture, and necessarily raises to a marked extent the price at which brake bands, etc., can be purchased by the user.

It has been proposed heretofore to prepare brake linings or shoes by a method or process according to which sheets composed of asbestos are immersed in a reaction product of phenol and formaldehyde and impregnated therewith. Then the impregnated sheets are cut or stamped into strips or pieces of proper length and width. Then the said strips or pieces are bent or otherwise formed into suitable shape. After having been bent or formed they are hardened by heat. There are certain material practical disadvantages in connection with this procedure. Two of these disadvantages grow out of the impregnating of the sheets before they are cut into strips. That is to say, the asbestos sheet material is very hard to cut after having been impregnated. Furthermore, there is much waste in cutting. Impregnated waste cannot be utilized so far as I am aware; I am not acquainted with any way of using it. Another disadvantage is incident to the bending of the impregnated strips or pieces before the hardening. The impregnated material is brittle before having been converted. I have not found it practical to proceed by bending the impregnated but unconverted material while cold, on account of the breakage. It has been proposed, in carrying into effect this second method or process, to effect the hardening by heat at atmospheric pressure. My experience has shown that the uncompressed strip would be absorbent. An absorbent brake-band would swell as a result of access of water or oil, and inasmuch as in use adjustments are close the brake would drag. So also, either water or oil absorbed by the band would act as a lubricant, lessening the braking efficiency.

The general object of the invention is a method better than that last described, free from the disadvantages thereof, and having various practical advantages, for the manufacture of brake bands, brake blocks, and other articles of the same general class, without the moulding operations which have been described, and without necessity for moulds on the order of those heretofore employed in performing such operation, so as thereby to eliminate the expense and other drawbacks which are incident to the employment of moulds, and in addition materially expedite the manufacture of the desired articles and reduce the cost of such manufacture.

The invention will first be explained with reference to the accompanying drawings, after which it will be defined in the claims.

In the drawings,—

Fig. 1 illustrates conventionally a portion of a sheet of body material.

Fig. 2 illustrates the step of submitting a strip of said body material to compression.

Fig. 3 illustrates a strip bent into substantially annular form, together with the manner and means of holding one bent strip under restraint in its bent form while it cools and until it becomes permanently set in such form. This view is on a different scale from the other views.

In carrying the invention into effect I no longer employ moulds having circular or annular material-receiving cavities corresponding in shape, proportions, and curvature with the band to be produced. On the contrary, I proceed by producing a strip comprising or including the desired mouldable material or compound, and this strip, after having been prepared by certain treatment which is described below, I bend into the curvature of the brake band, brake block, or the like.

Preferably I produce a strip having essentially the same composition as brake bands, brake blocks, etc., in practice heretofore, namely comprising a combination of indurating material with fibrous and/or cellular material. The indurating material employed as an element of the said combination is an impregnating substance that hardens during the operations performed in the manufacture of the articles, or subsequent thereto. Such material is exemplified by the phenol condensation product or synthetic resin known in the market as bakelite.

I may produce the strip in different ways. One expeditious and otherwise advantageous way is the following: Assuming asbestos to be utilized as body material, I form the asbestos in customary manner into sheet form, as for example, into what may be termed mill board. See Fig. 1. I cut a sheet, 1, Fig. 1, of such mill board into strips of the required dimensions, as for instance along dotted lines 2, 2, in Fig. 1. I then impregnate each strip with a bakelite, i. e., phenol condensation product, compound, of which there are several varieties in the market. I then subject the impregnated strip to compression in the presence of heat, as for instance between heated plates or blocks 3, 4, Fig. 2. The compression is maintained for a sufficient period of time to enable the desired changes in the condition of the bakelite to take place, such changes involving more or less condensing and hardening of the bakelite. While the material of the strip is still warm and retains a certain amount of pliability I relieve the strip of compression and bend the same into the required circular or curved form of a brake band, 5, or the like, as in Fig. 3. I now transfer the article to a former, as 6, Fig. 3, and apply to the latter convenient means for confining the article in place upon the former, and restraining it in the form which has been given to it, while the material of the bent strip further cools, the bakelite becomes definitely hard, and the strip becomes permanently set in such form. The means for confining the article upon the former may be constituted as in Fig. 3 by a clamping band 7 encircling the former and the article applied thereto and tightened by means of one or more thumb-screws 8 having winged-heads 9, or by other convenient means, so as to bind the article closely to the exterior of the former.

As a result of the compression of the impregnated strip during the progress of the reaction and conversion of the phenol condensation product, the substance of the strip is condensed, rendering it much more dense, and securing better wearing quality. The finished brake-band is non-absorptive of moisture and oil, and consequently is free from drawbacks that have been indicated earlier herein.

As one result of the bending, the particles of material composing the band become more or less condensed on the inner or concave surface thereof, thereby improving the wearing qualities, etc., while at the exterior or convex surface the material is extended slightly.

What is claimed as the invention is:

1. The method of making brake bands and other articles of the class described which consists in producing a strip of material comprising or including suitable indurating material, then condensing the strip by compression in the presence of heat, then relieving the strip of compression and while the strip is still warm and sufficiently pliable bending the same into the required curved form of the desired brake band or the like, and then allowing the article to cool and become permanently set in the said curved form.

2. The method of making brake bands and other articles of the class described which consists in producing a sheet of body material, then dividing said sheet into strips of width proper for the band to be produced, then impregnating a strip with suitable indurating compound, then subjecting the impregnated strip to compression in the presence of heat, then relieving the strip of compression and while the strip is still warm and sufficiently pliable bending the same into the required curved form of the desired brake band or the like, and then allowing the article to cool and become permanently set in the said curved form.

3. The method of making brake bands and other articles of the class described which consists in making a strip of body material, then impregnating such strip with a phenol condensation product, then subjecting the impregnated strip to compression in the presence of heat, then relieving the strip of compression and while the strip is still warm and sufficiently pliable bending the same into the required curved form of the desired brake band or the like, and then allowing the article to cool and become permanently set in the said curved form.

4. The method of making brake bands and other articles of the class described which consists in producing a strip of material comprising or including suitable indurating material, then subjecting the strip to compression in the presence of heat, then relieving the strip of compression and while the strip is still warm and sufficiently pliable bending the same into the required curved form of the desired brake band or the like, and then restraining the article in said form while it cools and until it becomes permanently set in such form.

5. The method of making brake bands and other articles of the class described which consists in producing a sheet of body material, then dividing said sheet into strips of width proper for the band to be produced, then impregnating a strip with suitable indurating compound, then subjecting the impregnated strip to compression in the presence of heat, then relieving the strip of compression and while the strip is still warm and sufficiently pliable bending the same into the required curved form of the desired brake band or the like, and then restraining the article in said form while it cools and until it becomes permanently set in such form.

6. The method of making brake bands and other articles of the class described which consists in making a strip of body material, then impregnating such strip with a phenol condensation product, then subjecting the impregnated strip to compression in the presence of heat, then relieving the strip of compression and while the strip is still warm and sufficiently pliable bending the same into the required curved form of the desired brake band or the like, and then restraining the article in said form while it cools and until it becomes permanently set in such form.

7. The method of making brake bands and other articles of the class described which consists in taking a strip of body material suitable for the required article which has been impregnated with the required phenol condensation product, then subjecting the said impregnated strip to compression in the presence of heat to consummate thereby the required reaction and conversion, then while the strip is still warm and sufficiently pliable bending the same into the required form of the said article, and then restraining the article in the said form while the article cools and until it becomes permanently set in such form.

8. The method of producing brake-bands and other articles, comprising cutting from body material suitable for the required article a blank of the desired length and width, then impregnating such blank with a suitable phenol condensation product in liquid form, then compressing the impregnated blank in flat relation to the required thickness in the presence of heat sufficient to consummate the reaction and conversion of the phenol condensation product into its fixed condition, then relieving the blank from the application of compression and heat, then while still warm and sufficiently pliable shaping it into the desired form, and holding it in such form while the article cools and until it becomes permanently set in such form.

THOMAS M. RUSSELL.